(12) United States Patent
Asahi et al.

(10) Patent No.: US 11,031,839 B2
(45) Date of Patent: Jun. 8, 2021

(54) MOTOR AND METHOD OF MANUFACTURING MOTOR

(71) Applicant: NIDEC CORPORATION, Minami-ku Kyoto (JP)

(72) Inventors: Yu Asahi, Minami-ku Kyoto (JP); Hidehiro Haga, Minami-ku Kyoto (JP); Shunsuke Murakami, Minami-ku Kyoto (JP); Masayoshi Maeda, Minami-ku Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 326 days.

(21) Appl. No.: 16/089,674

(22) PCT Filed: Mar. 25, 2017

(86) PCT No.: PCT/JP2017/012200
§ 371 (c)(1),
(2) Date: Sep. 28, 2018

(87) PCT Pub. No.: WO2017/170296
PCT Pub. Date: Oct. 5, 2017

(65) Prior Publication Data
US 2020/0313501 A1      Oct. 1, 2020

(30) Foreign Application Priority Data

Mar. 31, 2016    (JP) .............................. JP2016-072555

(51) Int. Cl.
*H02K 3/50*        (2006.01)
*H02K 5/22*        (2006.01)
(Continued)

(52) U.S. Cl.
CPC ............... *H02K 5/225* (2013.01); *H02K 3/50* (2013.01); *H02K 15/0062* (2013.01);
(Continued)

(58) Field of Classification Search
CPC ........ H02K 3/50; H02K 5/173; H02K 5/1732; H02K 5/22; H02K 5/225; H02K 11/33;
(Continued)

(56) References Cited

U.S. PATENT DOCUMENTS

2019/0326800 A1 * 10/2019 Pyeon .................... H02K 11/40
2020/0014286 A1 *  1/2020 Kim ....................... H02K 5/225

FOREIGN PATENT DOCUMENTS

JP       2011124045 A       6/2011
JP       2014143899 A  *    8/2014
(Continued)

OTHER PUBLICATIONS

Ishizeki, Machine Translation of JP2014143899, Aug. 2014 (Year: 2014).*
(Continued)

*Primary Examiner* — Quyen P Leung
*Assistant Examiner* — Eric Johnson
(74) *Attorney, Agent, or Firm* — Cantor Colburn LLP

(57) ABSTRACT

A motor includes a rotor including a rotation axis; a stator including coils; a cylindrical housing including an opening portion; busbars including busbar connecting portions; terminal pins including terminal connecting portions in a first direction orthogonal to an axial direction; a terminal support holding the terminal pins, wherein the housing has an insertion hole that opens towards an axial-direction one end side; the terminal support includes a protruding portion inserted into the insertion hole; one of the protruding portion and the insertion hole includes a fitting portion fitted to the other of the protruding portion and the insertion hole, and a guiding portion positioned on an insertion-end side of the fitting portion; and, in the guiding portion, a side surface on
(Continued)

a side of the first direction is inclined in a direction opposite to the first direction with increasing distance from an open end of the insertion hole.

11 Claims, 7 Drawing Sheets

(51) Int. Cl.
  *H02K 15/00*   (2006.01)
  *H02K 11/33*   (2016.01)
  *H02K 5/173*   (2006.01)
(52) U.S. Cl.
  CPC ............ *H02K 5/1732* (2013.01); *H02K 11/33* (2016.01); *H02K 2203/09* (2013.01)
(58) Field of Classification Search
  CPC . H02K 15/0062; H02K 2203/09; H01R 13/22

USPC .......................................................... 310/71
  See application file for complete search history.

(56) References Cited

FOREIGN PATENT DOCUMENTS

| | | |
|---|---|---|
| JP | 2015027240 A | 2/2015 |
| JP | 2015109742 A | 6/2015 |

OTHER PUBLICATIONS

International Search Report corresponding to Application No. PCT/JP2017/012200; dated Jun. 13, 2017.

\* cited by examiner

MOTOR AND METHOD OF MANUFACTURING MOTOR

This is the U.S. national stage of application No. PCT/JP2017/012200, filed on Mar. 25, 2017. Priority under 35 U.S.C. § 119(a) and 35 U.S.C. § 365(b) is claimed from Japanese Application No. 2016-072555, filed Mar. 31, 2016; the disclosures of which are incorporated herein by reference.

FIELD

The present disclosure relates to a motor and a method of manufacturing the motor.

BACKGROUND

Hitherto, among motors, there have been motors in which a rotor including a rotation axis and a stator are accommodated in the inside of a cylindrical housing including an opening portion at one end in an axial direction (disclosed in, for example, Japanese Unexamined Patent Application Publication No. 2015-109742). The rotor includes a magnet, and surrounds an axis of a shaft extending in the axial direction. The stator includes a plurality of coils, and is disposed on a radial-direction outer side of the rotor and faces the rotor.

One end of each lead wire extending from each coil is formed so as to extend in the axial direction. Each lead wire is connected to each of a plurality of terminal members provided at a terminal module. Each terminal member contacts each of a plurality of conductors (terminal pins) that are held by a terminal block. The conductors extend to the outside of the housing and are connected to, for example, an external power supply.

Here, each terminal member, provided at the terminal module, has a cylindrical shape in which an end surface in the axial direction is open. By inserting the terminal module into the housing in the axial direction, a distal end of each lead wire is fitted and connected to each terminal member.

However, in the motor disclosed in Japanese Unexamined Patent Application Publication No. 2015-109742 above, when mounting the terminal module on the housing, the terminal members and the distal ends of the lead wires interfere with each other in the axial direction, as a result of which it may become difficult to mount the terminal module at a predetermined location. Therefore, there is a problem in that the motor assembly man-hours are increased.

SUMMARY

An exemplary motor of the present disclosure includes a rotor that includes a rotation axis; a stator that includes a plurality of coils and that faces the rotor; a cylindrical housing that includes an opening portion at one end in an axial direction and that holds the stator; a plurality of busbars that include at one end busbar connecting portions extending in the axial direction and that has other end connected to each coil; a plurality of terminal pins that include at one end terminal connecting portions facing the busbar connecting portions in a first direction orthogonal to the axial direction and being connected to the busbar connecting portions; a terminal support that holds the plurality of terminal pins and that is mounted on the opening portion, wherein the housing has an insertion hole that opens towards an axial-direction one end side, wherein the terminal support includes a protruding portion that is inserted into the insertion hole, wherein one of the protruding portion and the insertion hole includes a fitting portion that is fitted to the other of the protruding portion and the insertion hole, and a guiding portion that is positioned on an insertion-end side of the fitting portion, and wherein, in the guiding portion, a side surface on a side of the first direction is inclined in a direction opposite to the first direction with increasing distance from an open end of the insertion hole.

An exemplary method of manufacturing a motor of the present disclosure is provided, the motor including a rotor that includes a rotation axis; a stator that includes a plurality of coils and that faces the rotor; a cylindrical housing that includes an opening portion at one end in an axial direction, that is provided with an insertion hole that opens towards an axial-direction one end side, and that holds the stator; a plurality of busbars, the coils being connected to the busbars at one end, the plurality of busbars including at other end busbar connecting portions extending in the axial direction; a plurality of terminal pins where terminal connecting portions are formed at one end, the terminal connecting portions facing the busbar connecting portions in a first direction orthogonal to the axial direction and being connected to the busbar connecting portions; and a terminal support that holds the plurality of terminal pins and that is mounted on the opening portion.

The method includes a motor unit assembly step of assembling the stator to which the busbars have been connected and the rotor in an inside of the housing; a terminal unit assembly step of mounting the terminal pins on the terminal support; and a connection step of mounting the terminal support on the housing and connecting the busbar connecting portions and the terminal connecting portions to each other, wherein the terminal support includes a protruding portion that is inserted into the insertion hole, and one of the protruding portion and the insertion hole includes a fitting portion that is fitted to the other of the protruding portion and the insertion hole, and a guiding portion that is positioned on an insertion-end side of the fitting portion, wherein, in the connection step, when a distal end of the protruding portion has been inserted into the insertion hole, the terminal connecting portions are disposed apart from the busbar connecting portions at a predetermined distance in a direction orthogonal to the axial direction, and wherein by bringing the guiding portion into contact with the protruding portion or the insertion hole, the terminal connecting portions approach the busbar connecting portions in a direction opposite to the first direction and after the terminal connecting portions have faced the busbar connecting portions, the fitting portion is fitted to the protruding portion or the insertion hole.

According to the exemplary embodiments of the present disclosure, a motor and a method of manufacturing the motor, which make it possible to prevent interference between the terminal connecting portions and the busbar connecting portions and mount the terminal support at a predetermined location, and which make it possible to reduce the assembly man-hours are provided.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 4:
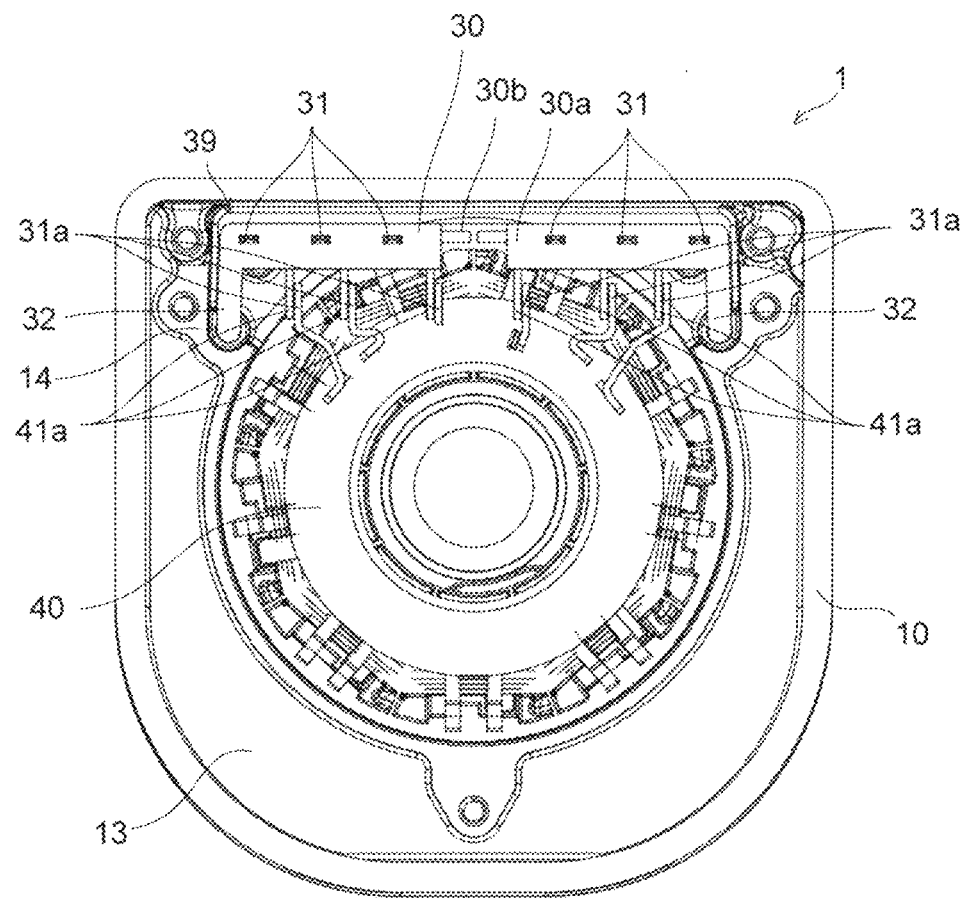
FIG. 4 is a top view of the motor according to the exemplary embodiment.

Exemplary embodiments of the present disclosure are described in detail below with reference to the drawings. A direction in which a central axis C of a motor 1 shown in FIG. 2 extends is simply called "axial direction", and a radial direction and a peripheral direction around the central axis C of the motor 1 are simply called "radial direction" and "peripheral direction". In plan view from the axial direction of the motor 1 in FIG. 4, a direction in which a distal end of each busbar connecting portion 41a extends is called "front-back direction", and a direction in which the plurality of busbar connecting portions 41a are arranged side by side is called "left-right direction". The "axial direction", the "front-back direction", and the "left-right direction" are orthogonal to each other. In FIG. 4, the "left-right direction" is such that, when terminal pins 31 are viewed from the central axis C, the left side is an X1 direction and the right side is an X2 direction. The "front-back direction" is such that, when the terminal pins 31 are viewed from the central axis C, the forward side is a Y1 direction and a backward side is a Y2 direction. The "axial direction" is such that a direction that is perpendicular to an upper side of a surface with respect to a sheet plane of FIG. 4 is a Z1 direction, and a direction that is perpendicular to a lower side of the surface with respect to the sheet plane of FIG. 4 is a Z2 direction. The "front-back direction", the "left-right direction", and "up-down direction" are names that are used simply for description, and do not limit the actual positional relationships and directions.

<1. Structure of Motor>

Figure 1:
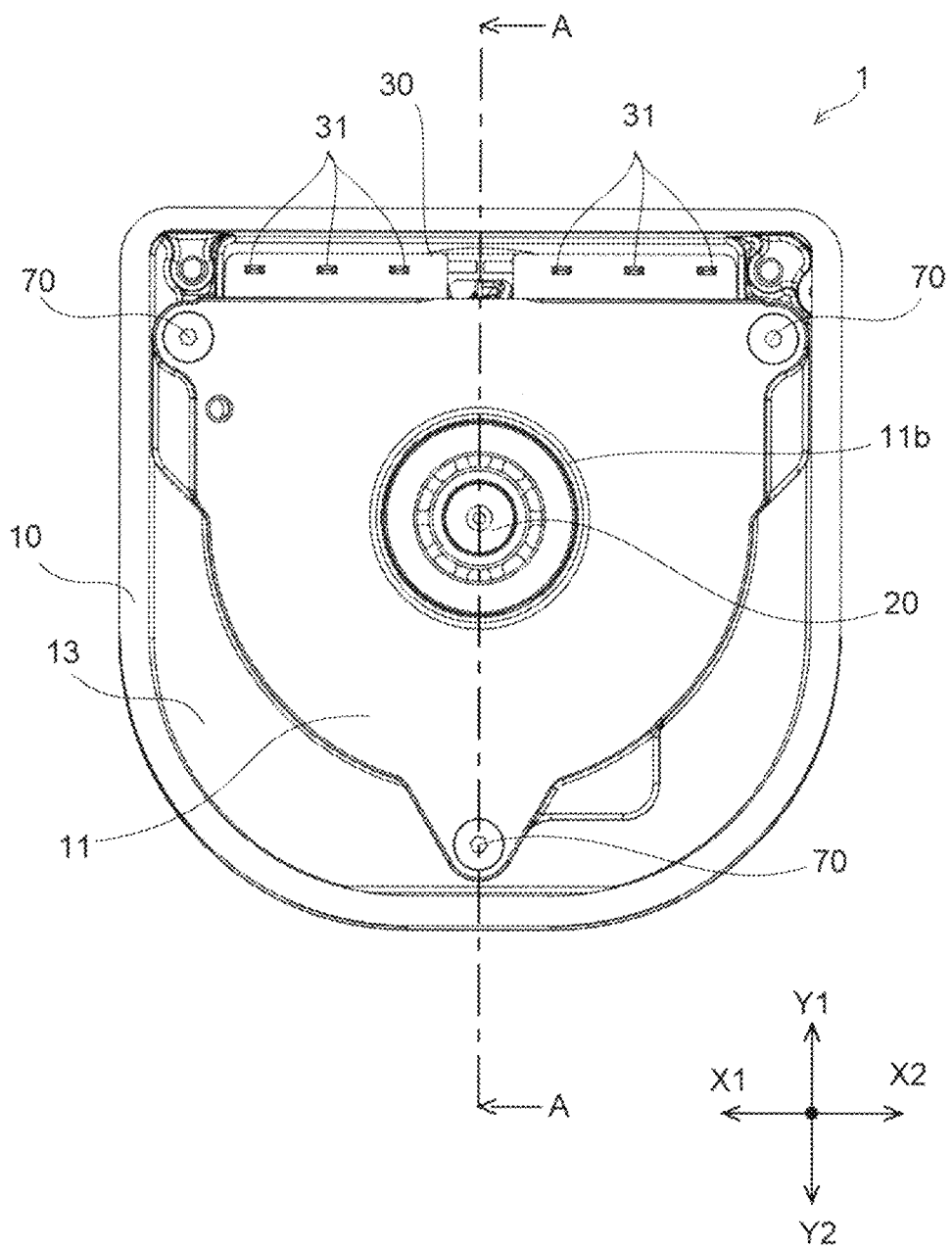
FIG. 1 is a top view of a motor according to an exemplary embodiment.
Figure 2:
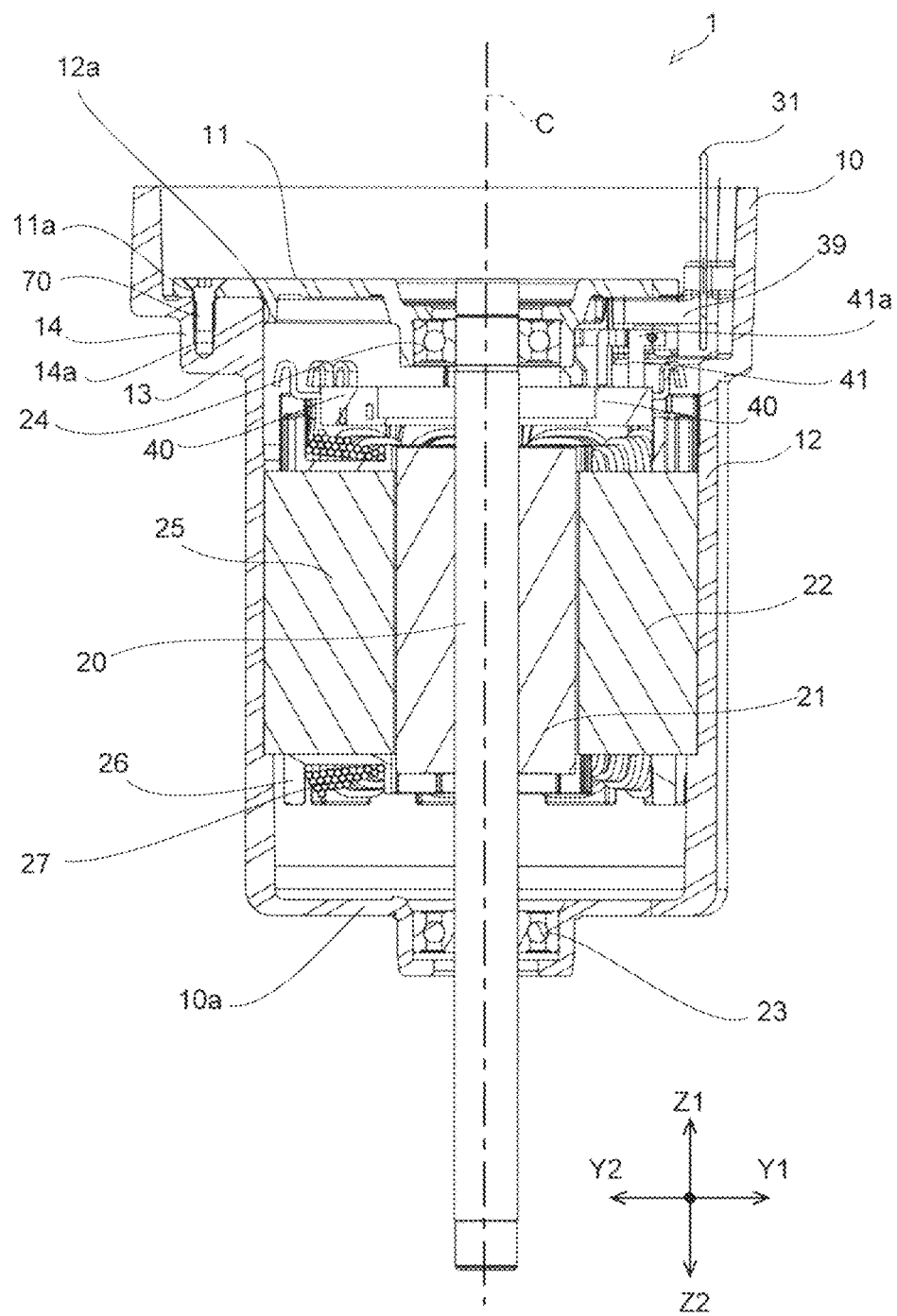
FIG. 2 is a sectional view along II-II of FIG. 1.
Figure 3:
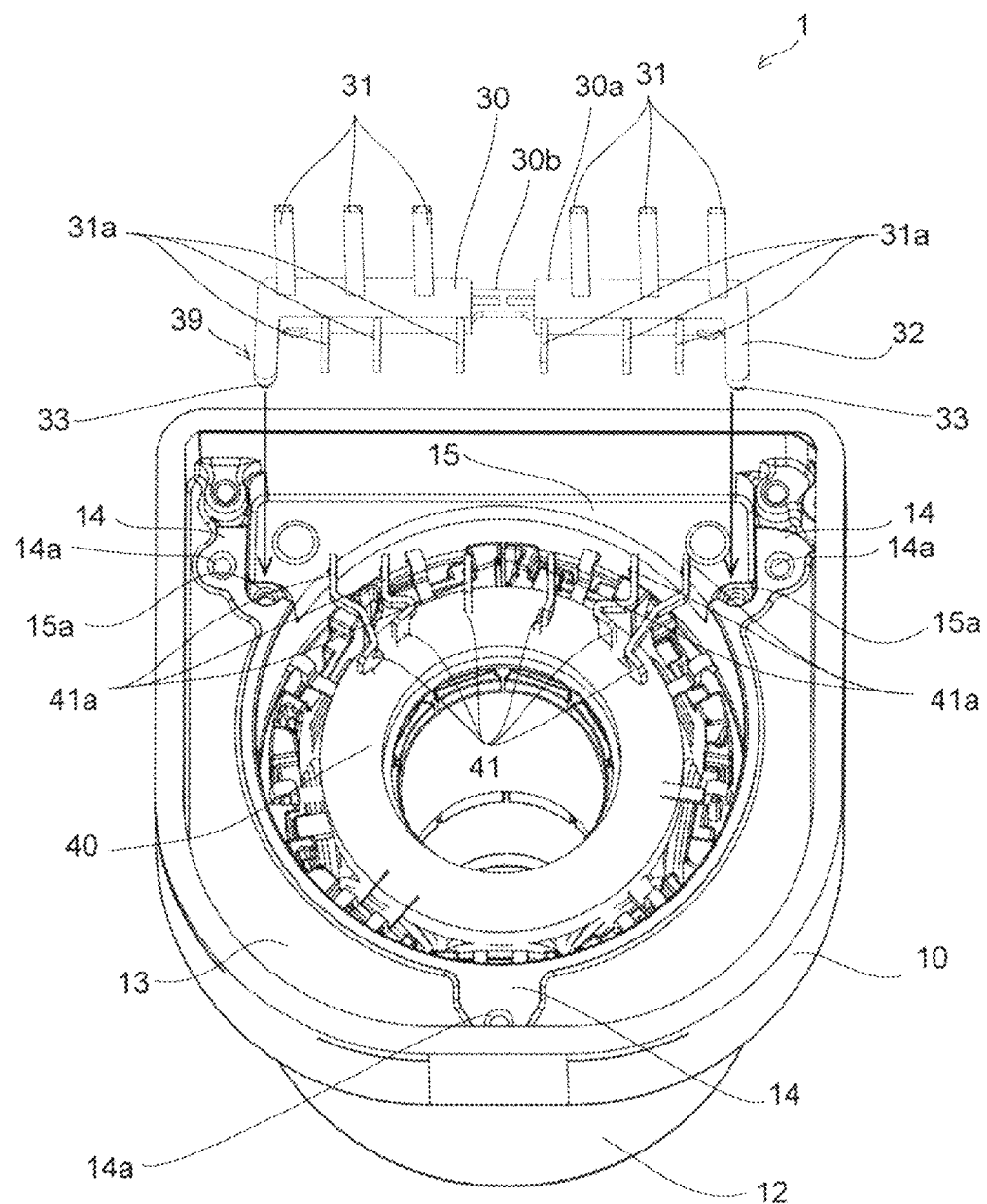
FIG. 3 is an exploded perspective view of the motor according to the exemplary embodiment.

A motor according to an exemplary embodiment of the present disclosure is described. FIG. 1 is a top view of the motor 1 according to an embodiment of the present disclosure. FIG. 2 is a sectional view along II-II of FIG. 1. FIG. 3 and FIG. 4 are, respectively, an exploded perspective view and a top view of the motor 1 according to the embodiment of the present disclosure, and show a state in which a cover 11 and a rotor 21 are excluded. The motor 1 includes a housing 10, the cover 11, the rotor 21, a stator 22, a busbar unit 40, and a terminal unit 39.

The housing 10 includes a cylindrical accommodating portion 12 that is bottomed and that includes a circular opening portion 12a at a top surface thereof. An extending portion 13 extending in the radial direction from a peripheral edge of the opening portion 12a is formed at the housing 10.

First recessed portions 14 and a second recessed portion 15 that are recessed downward are formed in a top surface of the extending portion 13. The first recessed portions are provided at equal intervals in the peripheral direction. In the present embodiment, the first recessed portions 14 are provided at three locations. The second recessed portion 15 is provided at one location between adjacent first recessed portions 14. The second recessed portion 15 is provided consecutively with the adjacent first recessed portions 14. A bottom surface of the second recessed portion 15 is positioned below a bottom surface of each first recessed portion 14. A threaded hole 14a is provided in the bottom surface of each first recessed portion 14. Insertion holes 15a that open towards one end side (Z1-direction side) in the axial direction are provided in two locations of the bottom surface of the second recessed portion 15.

The opening portion 12a is covered by the cover 11 from thereabove. Through holes 11a are provided at three locations of an outer peripheral portion of the cover 11. The cover 11 is disposed such that the through holes 11a and the threaded holes 14a are aligned with each other. Screws 70 inserted through the through holes 11a are screwed into and fastened to the threaded holes 14a. By this, the cover 11 and the housing 10 are fixed to each other.

The stator 22 and the rotor 21 are accommodated in the accommodating portion 12. The stator 22 has a substantially cylindrical outer peripheral surface. The stator 22 is fixed to an inner side of the accommodating portion 12. On a radial-direction inner side of the stator 22, the rotor 21 is disposed with a slight gap between the rotor 21 and an inner peripheral surface of the stator 22. The rotor 21 includes a columnar shaft 20 that forms a rotation axis extending along the central axis C and a plurality of magnets (not shown) that are disposed around the shaft 20.

The shaft 20 is supported by the housing 10 via a bearing 23. The shaft 20 is supported by the cover 11 via a bearing 24. More specifically, a distal-end side of the shaft 20 is supported by a bottom portion 10a of the housing 10 via the bearing 23. A proximal-end side of the shaft 20 is supported by the cover 11 via the bearing 24. The shaft 20 is supported by the bearing 23 and the bearing 24 so as to be rotatable with respect to the housing 10 and the cover 11.

The stator 22 includes a core 25, an insulator 26, and coils 27. The core 25 is formed from a laminated steel plate. The core 25 includes a plurality of teeth. The coils 27 are formed by winding conductors around each teeth of the core 25 via the insulator 26.

The ring-shaped busbar unit 40 is mounted on an upper portion of the stator 22. The busbar unit 40 holds two sets of three busbars 41 corresponding to three phases, a U phase, a V phase, and a W phase. An end portion of each coil 27 is connected to the busbars 41 at one end.

The busbar connecting portions 41a are formed on the other end of each busbar 41. The busbar connecting portions 41a are connected to terminal connecting portions 31a (described later). Each busbar connecting portion 41a extends to the axial-direction upper side (Z1 direction), is bent a plurality of times, and its distal end is formed along the Y1 direction. Adjacent busbar connecting portions 41a are arranged side by side in the left-right direction (X1-X2 direction), and connection surfaces of the adjacent busbar connecting portions 41a are parallel to each other. Each busbar 41 is a strip-shaped conductive member. Each busbar 41 is formed with a predetermined shape by, for example, performing processing operations, such as cutting and bending, on, for example, a copper plate.

The terminal unit 39 includes a terminal support 30 and a plurality of terminal pins 31. The terminal support 30 holds two sets of three terminal pins 31 corresponding to the three phases, the U phase, the V phase, and the W phase. The terminal support 30 is formed from an insulating member. The terminal support 30 holds the terminal pins 31 in an insulated state from each other.

The terminal pins 31 are formed from strip-shaped metal plates. Each terminal connecting portion 31a extending in the front-back direction (Y1-Y2 direction) is provided at one end of each terminal pin 31. The other end of each terminal pin 31 extends in the axial direction (Z1-Z2 direction) and protrudes above the cover 11. The terminal connecting portions 31a are arranged side by side in the left-right direction (X1-X2 direction) at locations corresponding to the bus-bar connecting portions 41a. Connection surfaces of the respective terminal connecting portions 31a are disposed parallel to each other.

Axial-direction (Z1-Z2 direction) lengths of the connection surfaces of the terminal connecting portions 31a are larger than the connection surfaces of the busbar connection portions 41a. Therefore, when connecting the busbar connecting portions 41a and the terminal connection portions 31a to each other, the area of contact between the busbar connecting portions 41a and the terminal connecting portions 31a can be made large. As a result, it is possible to prevent contact failure between the busbar connecting portions 41a and the terminal connecting portions 31a.

By bending each terminal pin 31 and inserting each terminal pin 31 into a grooved portion (not shown) formed in the terminal support 30, the terminal unit 39 is assembled. However, the terminal pins 31 and the terminal support may be formed by insert molding.

The terminal support 30 includes a rectangular parallelepiped body portion 30a that holds each terminal pin 31, and arm portions 32 that extend from the body portion 30a. The arm portions 32 are provided at respective end portions of the body portion 30a in a direction in which the terminal pins 31 are arranged side by side (X1-X2 direction). The arm portions 32 extend in the same direction (Y2 direction) as the terminal connecting portions 31a. Protruding portions 33 protruding towards an axial-direction lower side (Z2 direction) are each formed on a distal end of its corresponding arm portion 32. A cover portion 30b is provided at the body portion 30a so as to be disposed between the protruding portions 33 at respective ends in the left-right direction.

By inserting the protruding portions 33 into the insertion holes 15 a, the terminal support 30 is positioned at a predetermined location of the second recessed portion 15 and mounted thereon. By this, the terminal connecting portions 31 a contact and are electrically connected with the busbar connecting portions 41 a. Each terminal connecting portion 31 a faces each busbar connecting portion 41 a in the X2 direction (a direction opposite to the first direction) orthogonal to the axial direction, and is connected to each bulbar connecting portion 41 a. For example, each terminal connecting portion 31 a and each busbar connecting portion 41 a are connected to each other by welding.

At this time, the cover portion 30b at a left-right-direction central portion of the body portion 30a overlaps the stator 22 in the axial direction (Z1-Z2 direction). Therefore, the terminal unit 39 is mounted close to the stator 22, and the size of the motor 1 can be reduced.

The arm portions 32 are integrally formed with the terminal support 30 by molding resin, and are elastic. Therefore, when the protruding portions 33 are inserted into the insertion holes 15a, it is possible to, by the arm portions 32, urge the terminal support 30 in the left-right direction (X1-X2 direction), and push the terminal connecting portions 31a against the busbar connecting portions 41a. By this, it is possible to reliably connect the terminal connecting portions 31a and the busbar connecting portions 41a and prevent contact failure.

With the terminal support 30 placed in the second recessed portion 15, the opening portion 12a is covered by the cover 11 from thereabove, and the cover 11 is screwed to the housing 10 with the screws 70. By this, the terminal support 30 interposed between the cover 11 and the housing 10 is fixed.

At this time, the terminal pins 31 protrude upward from a radial-direction outer side of the cover 11, and extend to the outside of the housing 10. By this, the motor 1 can be connected to an external device (such as an inverter) via the terminal pins 31.

<2. Shape of Protruding Portions>

Figure 5:
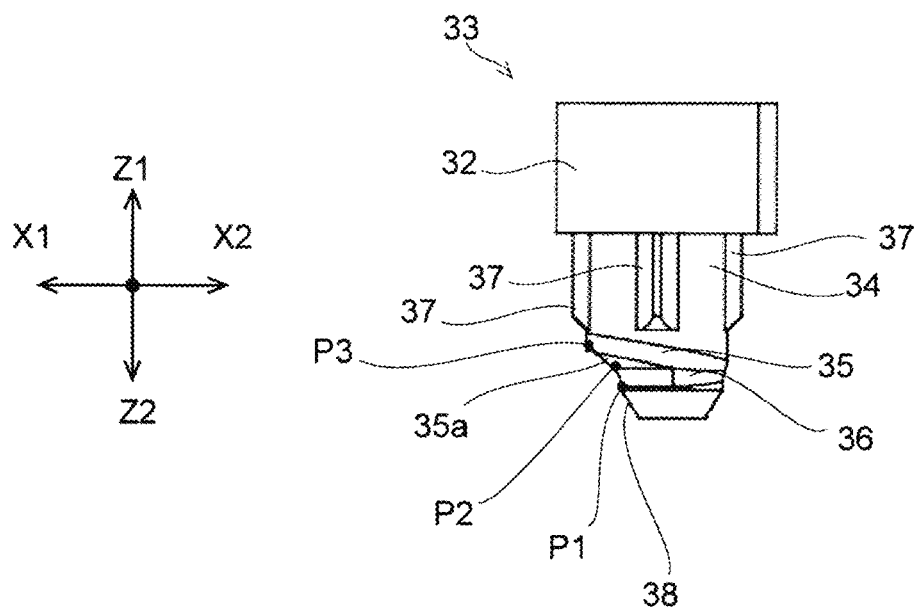
FIG. 5 is a side sectional view of a protruding portion of the motor according to the exemplary embodiment.
Figure 6:
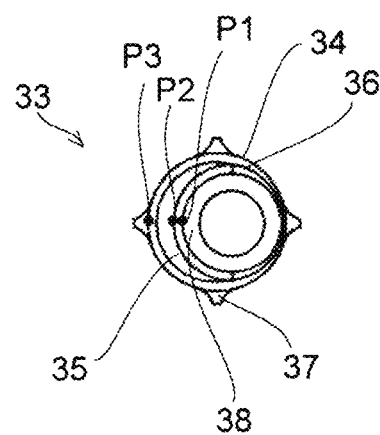
FIG. 6 is a bottom view of the protruding portion of the motor according to the exemplary embodiment.

FIG. 5 and FIG. 6 are, respectively, a side view and a bottom view of a protruding portion 33 according to the exemplary embodiment of the present disclosure. FIG. 5 and FIG. 6 illustrate the protruding portion disposed at an end portion on an X1-direction side in FIG. 3. The protruding portion 33 is integrally formed with the terminal support 30, and protrudes downward from the arm portion 32. The protruding portion 33 includes a fitting portion 34, a guiding portion 35, and a columnar portion 36.

The fitting portion 34 has a substantially circular cylindrical shape. A plurality of ribs 37 extending in an insertion direction parallel to the axial direction (Z1-Z2 direction) are provided on a peripheral surface of the fitting portion 34. When the protruding portion 33 is inserted into the insertion hole 15a, the fitting portion 34 is fitted to the insertion hole 15a via the ribs 37.

The guiding portion 35 is positioned on an insertion end side (Z2-direction side) of the fitting portion 34. The columnar portion 36 at a distal end of the guiding portion 35 is decentered in the X2 direction with respect to the fitting portion 34. The guiding portion 35 has an inclined surface (point P2 to point P3) at a side surface on the X1-direction (first-direction) side. With the protruding portion 33 inserted in the insertion hole 15a, the inclined surface (point P2 to point P3) of the guiding portion 35 is inclined in the X2 direction (direction opposite to the first direction) with increasing distance from an open end of the insertion hole 15a (see FIG. 9).

The columnar portion 36 has a circular cylindrical shape. The columnar portion 36 protrudes at the distal end of the guiding portion 35. The columnar portion 36 is thinner than the fitting portion 34. A peripheral surface of the columnar portion 36 is formed parallel to the axial direction. A chamfered portion 38 is chamfered on a distal end of the columnar portion 36.

<3. Manufacturing Process>

A method of manufacturing the motor 1 includes a motor unit assembly step, a terminal unit assembly step, and a connection step.

In the motor unit assembly step, the stator 22 to which the busbars 41 have been connected and the rotor 21 are assembled in the inside of the housing 10. In the terminal unit assembly step, the terminal pins 31 are mounted on the terminal support 30.

Figure 7:
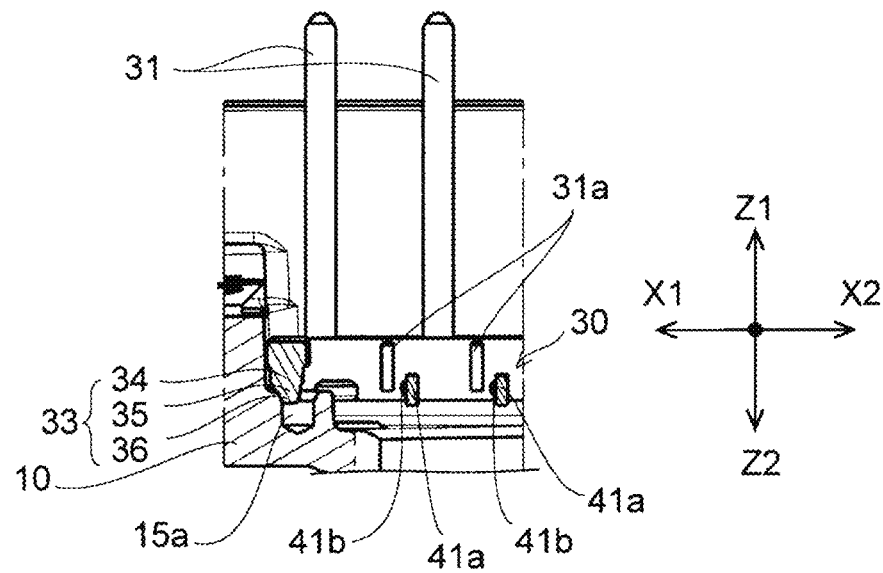
FIG. 7 is an explanatory view showing a connection step of connecting busbar connecting portions and terminal connecting portions according to an exemplary embodiment.
Figure 8:
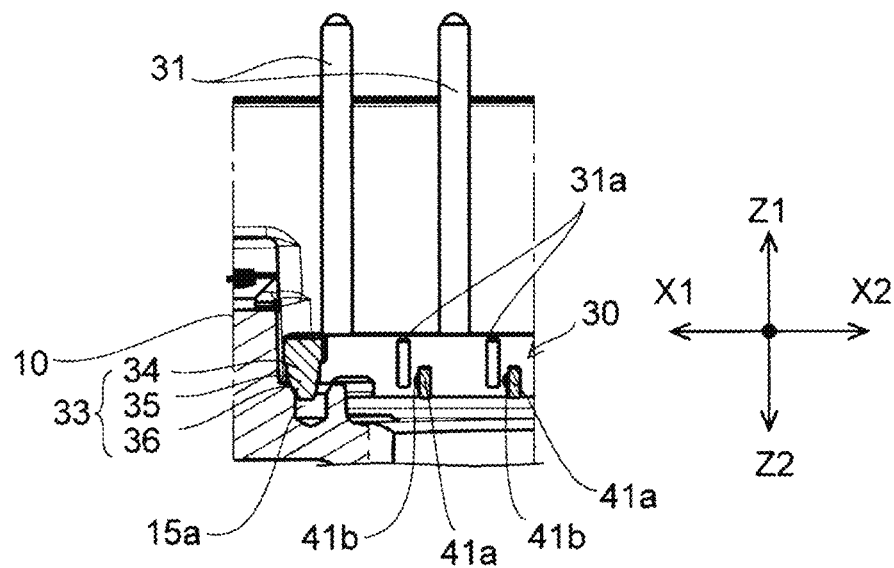
FIG. 8 is an explanatory view showing the connection step of connecting the busbar connecting portions and the terminal connecting portions according to the exemplary embodiment.
Figure 9:
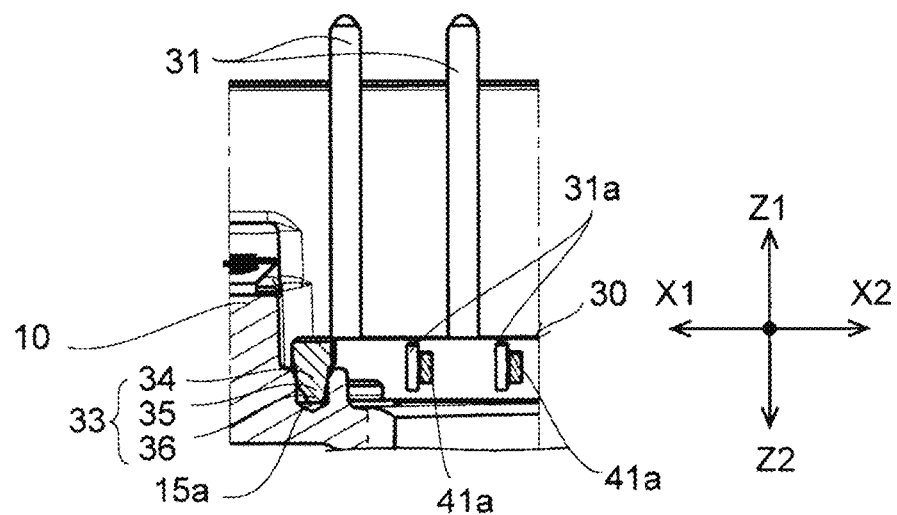
FIG. 9 is an explanatory view showing the connection step of connecting the busbar connecting portions and the terminal connecting portions according to the exemplary embodiment.

In the connection step, the terminal support 30 is mounted on the housing 10, and the busbar connecting portions 41a and the terminal connecting portions 31a are connected to each other. FIG. 7 to FIG. 9 are each an explanatory view showing the connection step of connecting the busbar connecting portions 41a and the terminal connection portions 31a according to an exemplary embodiment of the present disclosure, and each show an end portion on the X1-direction side in FIG. 3.

In the connection step, the protruding portion 33 of the terminal support 30 is inserted into the insertion hole 15a of the housing 10, and the terminal support 30 is positioned. At this time, as shown in FIG. 7, the terminal support 30 is disposed at a location where the fitting portion 34 is slightly displaced from the insertion hole 15a in the left direction (X1 direction), and the insertion of the protruding portion 33 is started. At this time, a gap is formed between the terminal connecting portions 31a and the busbar connecting portions 41a in a normal direction to the busbar connecting portions 41a (X1-X2 direction).

Next, when the terminal support 30 is pushed downward (Z2 direction) in the axial direction, as shown in FIG. 8, the inclined surface (point P2 to P3; see FIG. 5) of the guiding portion 35 slides along the open end of the insertion hole 15a. By this, while the terminal connecting portions 31a move downward (Z2 direction), the terminal connecting portions 31a move rightwards (X2 direction) and approach the busbar connecting portions 41a. As shown in FIG. 7 and FIG. 8, busbar protrusions 41b that protrude in a direction towards the terminal connecting portions 31a (X1 direction) are provided on surfaces (surfaces on the X1-direction side) of the busbar connecting portions 41a facing the terminal connecting portions 31a.

Next, when the terminal support 30 is further pushed downward (Z2 direction) in the axial direction, as shown in FIG. 9, the fitting portion 34 is fitted to the insertion hole 15a, and the terminal support 30 is mounted on the second recessed portion 15. At this time, the terminal connecting portions 31a contact the busbar connecting portions 41a. The terminal connecting portions 31a and the busbar connecting portions 41a are welded. At this time, since the busbar protrusions 41b are provided on the busbar connecting portions 41a, even if the busbar connecting portions 41a and the terminal connecting portions 31a are tilted relative to each other in the axial direction, welding conditions can be made constant. That is, the area of contact between the busbar connecting portions 41a and the terminal connecting portions 31a is substantially equal to the area of a distal end of each busbar protrusion 41b at all times. Therefore, the terminal connecting portions 31a and the busbar connecting portions 41a can be firmly connected to each other.

By this, until the fitting portion 34 is fitted to the insertion hole 15a, the terminal connecting portions 31a and the busbar connecting portions 41a are disposed apart from each other in the left-right direction (X1-X2 direction). By this, when the terminal support 30 is mounted, it is possible to prevent interference between the terminal connecting portions 31a and the busbar connecting portions 41a.

In the state of FIG. 9, the fitting length of the fitting portion 34 is smaller than the length in an insertion direction (Z1-Z2 direction) from an upper end (distal end on a Z1-direction side) of each busbar connecting portion 41a to a lower end (distal end on a Z2-direction side) of each terminal connecting portion 31a. By this, after disposing the terminal connecting portions 31a so as to face the busbar connecting portions 41a, the fitting portion 34 is fitted to the insertion hole 15a. Therefore, it is possible to reliably prevent interference between the terminal connecting portions 31a and the busbar connecting portions 41a. Further, the fitting length of the fitting portion 34 is smaller than the length in the insertion direction (Z1-Z2 direction) from an upper end (distal end on the Z1-direction side) of the busbar protrusion 41b of each busbar connecting portion 41a to the lower end (distal end on the Z2-direction side) of each terminal connecting portion 31a. By this, after disposing the terminal connecting portions 31a so as to face the busbar protrusions 41b of the busbar connecting portions 41a, the fitting portion 34 is fitted to the insertion hole 15a. Therefore, the lower ends of the terminal connecting portions 31a are prevented from becoming caught by the busbar protrusions 41b.

Although FIG. 5 to FIG. 9 show the protruding portion 33 disposed at the end portion on the X1-direction side in FIG. 3, the protruding portion 33 disposed at an end portion on the X2-direction side also has the same shape. That is, the left and right protruding portions 33 move downward (Z2 direction) in the axial direction, and are guided by the guiding portions 35 in the X2 direction. By providing a plurality of protruding portions 33 and insertion holes 15a, it is possible to stably mount the terminal support 30 on the housing 10.

In the present embodiment, the terminal connecting portions 31a face the busbar connecting portions 41a in the X2 direction (a direction opposite to the first direction) orthogonal to the axial direction, and are connected to the busbar connecting portions 41a. The protruding portions 33 of the terminal support 30 each include the guiding portion 35 on an insertion-end side of the fitting portion 34 that is fitted to the insertion hole 15a. The side surface of each guiding portion 35 on the X1-direction side is inclined in the X2 direction with increasing distance from the open end of the insertion hole 15a.

Therefore, in the connection step, the protruding portions 33 are inserted into the insertion holes 15a at locations where the terminal connecting portions 31a are disposed apart from the busbar connecting portions 41a in the X1 direction. When the protruding portions 33 are pushed downward, the terminal connecting portions 31a move downward (Z2 direction) in the axial direction, the guiding portions 35 contact the insertion holes 15a and the terminal connecting portions 31a slide in the X2 direction, and the terminal connecting portions 31a approach the busbar connecting portions 41a. Then, after the terminal connecting portions 31a have faced the busbar connecting portions 41a, the fitting portions 34 are fitted to the insertion holes 15a, and the terminal connecting portions 31a contact the busbar connecting portions 41a.

Therefore, it is possible to prevent interference between the terminal connecting portions 31a and the busbar connecting portions 41a and mount the terminal support 30 at a predetermined position, and to reduce the motor-1 assembly man-hours.

The fitting length of the fitting portions 34 is smaller than the length in the insertion direction (Z1-Z2 direction) from the upper end (distal end on the Z1-direction side) of each busbar connecting portion 41a to the lower end (distal end on the Z2-direction side) of each terminal connecting portion 31a. By this, after disposing the terminal connecting portions 31a so as to face the busbar connecting portions 41a, the fitting portions 34 are fitted to the insertion holes 15a. Therefore, it is possible to reliably prevent interference between the terminal connecting portions 31a and the busbar connecting portions 41a.

The distal end of each guiding portion 35 is decentered in the X2 direction with respect to its corresponding fitting portion 34. By this, with the terminal connecting portions 31a disposed apart from the busbar connecting portions 41a in the X1 direction, it is possible to insert the protruding portions 33 into the insertion holes 15a.

A side surface of each fitting portion 34 is provided with the plurality of ribs 37 extending in the insertion direction. Therefore, the fitting portions 34 can be easily press-fitted to the insertion holes 15a. Consequently, it is possible to reliably position the terminal support 30 at a predetermined location.

A plurality of protruding portions 33 and insertion holes 15a are provided. Therefore, it is possible to stably mount the terminal support 30 on the housing 10.

The terminal support 30 includes two protruding portions 33 at end portions in a direction in which the plurality of terminal pins 31 are arranged side by side. The terminal support 30 includes the cover portion 30b that is disposed between the two protruding portions 33 and that overlap the stator 22 in the axial direction (Z1-Z2 direction). By this, the terminal unit 39 is mounted close to the stator 22, and the size of the motor 1 can be reduced.

The terminal support 30 includes the arm portions 32 extending from the body portion 30a in the same direction (Y1-Y2 direction) as the terminal connecting portions 31a. The protruding portions 33 are each positioned on a distal end of its corresponding arm portion 32. Therefore, it is possible to dispose the body portion 30a apart from the insertion holes 15a by the arm portions 32. By this, the design flexibility regarding the mounting position of the terminal support 30 is improved.

Since the arm portions 32 are elastic and urging is performed in the X2 direction by the arm portions 32, the terminal connecting portions 31a are pushed against the busbar connecting portions 41a. By this, it is possible to reliably connect the terminal connecting portions 31a and the busbar connecting portions 41a and prevent contact failure.

In the present embodiment, the columnar portions 36 and the insertion holes 15a may be made long in the axial direction (Z1-Z2 direction). At this time, each columnar portion 36 has a circular cylindrical shape. A side surface of each columnar portion 36 on the X1-direction (first-direction) side (point P1 to point P2) is formed parallel to the axial direction. Therefore, until the guiding portions 35 are inserted into the insertion holes 15a, the terminal support 30 moves parallel to the axial direction. By this, it is possible to reliably prevent interference between the terminal connecting portions 31a and the busbar connecting portions 41a. The side surface of each columnar portion 36 on the X1-direction (first-direction) side (point P1 to point P2) may be formed into an inclined surface whose inclination angle with respect to the axial direction (Z1-Z2 direction) is smaller than that of the inclined surface (point P2 to point P3) of each guiding portion 35.

In the present embodiment, the terminal support 30 holds two sets of three terminal pins 31 corresponding to the three phases, the U phase, the V phase, and the W phase. However, the terminal support 30 may hold one set of three terminal pins 31 corresponding to the three phases, the U phase, the V phase, and the W phase. In this case, the corresponding busbar unit 40 only needs to be provided with one set of three busbars 41 corresponding to the three phases, the U phase, the V phase, and the W phase.

Figure 10:
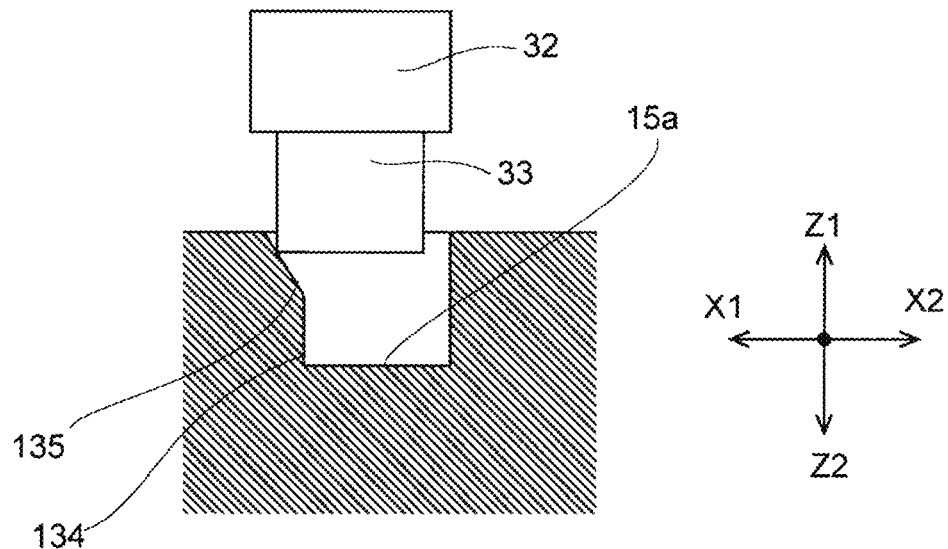
FIG. 10 is a side sectional view showing a modification of a guiding portion and the protruding portion according to the exemplary embodiment.

FIG. 10 is a side sectional view showing a modification of a guiding portion and a protruding portion according to the exemplary embodiment of the present disclosure. In the embodiment above, each protruding portion 33 includes the fitting portion 34, which is fitted to the insertion hole 15a, and the guiding portion 35. However, each insertion hole 15a may include a fitting portion 134, which is fitted to the protruding portion 33, and a guiding portion 135. At this time, each protruding portion 33 has a circular cylindrical shape. Each protruding portion 33 is fitted to the fitting portion 134 of its corresponding insertion hole 15a. A side surface of each guiding portion 135 on the X1-direction (first-direction) side only needs to be formed so as to be inclined in the X2 direction (direction opposite to the first direction) with increasing distance from the open end of the insertion hole 15a.

The embodiments and modifications described above are merely exemplifications of the present disclosure. The structures of the embodiments and modifications may be changed as appropriate without exceeding the bounds of the technical ideas of the present disclosure. The embodiments and modifications may be combined within an allowable scope and implemented.

Detailed structures of the motor 1 may differ in the embodiments and modifications above. In addition, each element that appears in the embodiments and modifications above may be combined as appropriate as long as no conflict arises.

The embodiments of the present disclosure are applicable to, for example, an electric power steering device used to help perform a steering-wheel operation of a vehicle, such as an automobile. In the power steering device including the motor of the embodiment of the present disclosure, it is possible to improve assembly efficiency.

The embodiments of the present disclosure are widely applicable to various devices including a motor, such as a vacuum cleaner, a dryer, a ceiling fan, a washing machine, a refrigerator, and an electric power steering device.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A motor comprising:
a rotor comprising a rotation axis;
a stator comprising a plurality of coils and that faces the rotor;
a cylindrical housing comprising an opening portion at one end in an axial direction and that holds the stator;
a plurality of busbars, each of the plurality of busbars comprising a first end with a busbar connecting portion extending in the axial direction, and a second end connected to each coil;
a plurality of terminal pins, each of the plurality of terminal pins comprising a first end with a terminal connecting portion being connected to one of the busbar connecting portions; and
a terminal support that holds the plurality of terminal pins and that is mounted on the opening portion,
wherein the housing comprises an insertion hole that opens towards an axial-direction one end side,
wherein each of the busbar connecting portions faces one of the terminal connecting portions in a first direction orthogonal to the axial direction, wherein the terminal support comprises a protruding portion that is inserted into the insertion hole, wherein one of the protruding portion and the insertion hole comprises a fitting portion that is fitted to the other of the protruding portion and the insertion hole, and a guiding portion that is positioned on an insertion-end side of the fitting portion, wherein, in the guiding portion, a side surface on a side of the first direction is inclined in a direction opposite to the first direction with increasing distance from an open end of the insertion hole, and wherein when the protruding portion comprises the fitting portion and the guiding portion, a center of a distal end of the guiding portion is decentered in the direction opposite to the first direction with respect to a center of the fitting portion; and when the insertion hole comprises the fitting portion and the guiding portion, a distal end of the guiding portion is decentered in the first direction with respect to the center of the fitting portion.

2. The motor according to claim 1, wherein a fitting length of the fitting portion is smaller than a length in an insertion direction from a distal end of each busbar connecting portion on the axial-direction one end side to a distal end of each terminal connecting portion on a side opposite to the axial-direction one end side.

3. The motor according to claim 1, wherein the fitting portion and the guiding portion are provided at the protruding portion, wherein the protruding portion comprises a columnar portion that protrudes from the distal end of the guiding portion and that is thinner than the fitting portion, and wherein a side surface of the columnar portion on the side of the first direction is parallel to the axial direction or is an inclined surface whose inclination angle with respect to the axial direction is smaller than that of the guiding portion.

4. The motor according to claim 1, wherein a side surface of the fitting portion comprises a plurality of ribs extending in an insertion direction.

5. The motor according to claim 1, wherein a plurality of the protruding portions and a plurality of the insertion holes are provided.

6. The motor according to claim 5, wherein the terminal support comprises two of the protruding portions at end portions in a direction in which the plurality of terminal pins are arranged side by side, and comprises a cover portion that is disposed between the two of the protruding portions and that overlaps the stator in the axial direction.

7. The motor according to claim 1, wherein the terminal support comprises a body portion; and an arm portion that extends from the body portion in a same direction as the terminal connecting portions, wherein the plurality of the terminal connecting portions protrude from the body portion, and wherein the protruding portion is positioned at a distal end of the arm portion.

8. The motor according to claim 7, wherein the arm portion is elastic, and by urging of the arm portion, the terminal connecting portions are pushed against the busbar connecting portions.

9. A method of manufacturing a motor, the motor including a rotor comprising a rotation axis; a stator comprising a plurality of coils and that faces the rotor; a cylindrical housing comprising an opening portion at one end in an axial direction, that is provided with an insertion hole that opens towards an axial-direction one end side, and that holds the stator; a plurality of busbars, the coils being connected to the busbars at one end, the plurality of busbars including at other end busbar connecting portions extending in the axial direction; a plurality of terminal pins where terminal connecting portions are formed at one end, the terminal connecting portions being connected to the busbar connecting portions, the busbar connecting portion facing the terminal connecting portion in a first direction orthogonal to the axial direction; and a terminal support that holds the plurality of terminal pins and that is mounted on the opening portion, the method comprising:

assembling the stator to which the busbars have been connected and the rotor in an inside of the housing;

mounting the terminal pins on the terminal support; and mounting the terminal support on the housing and connecting the busbar connecting portions and the terminal connecting portions to each other, wherein the terminal support comprises a protruding portion that is inserted into the insertion hole, and one of the protruding portion and the insertion hole comprises a fitting portion that is fitted to the other of the protruding portion and the insertion hole, and a guiding portion that is positioned on an insertion-end side of the fitting portion, wherein, in the connecting the busbar connecting portions and the terminal connecting portions to each other, when a distal end of the protruding portion has been inserted into the insertion hole, the terminal connecting portions are disposed apart from the busbar connecting portions at a predetermined distance in a direction orthogonal to the axial direction, wherein by bringing the guiding portion into contact with the protruding portion or the insertion hole, the terminal connecting portions approach the busbar connecting portions in a direction opposite to the first direction and after the terminal connecting portions have faced the busbar connecting portions, the fitting portion is fitted to the protruding portion or the insertion hole, and wherein when the protruding portion comprises the fitting portion and the guiding portion, a center of a distal end of the guiding portion is decentered in the direction opposite to the first direction with respect to a center of the fitting portion; and when the insertion hole comprises the fitting portion and the guiding portion, a distal end of the guiding portion is decentered in the first direction with respect to the center of the fitting portion.

10. The method of manufacturing the motor according to claim 9, wherein a side surface of the guiding portion on a side of the first direction is inclined in the direction opposite to the first direction with increasing distance from an open end of the insertion hole.

11. The method of manufacturing the motor according to claim 9 wherein the fitting portion and the guiding portion are provided at the protruding portion, and the protruding portion includes a columnar portion that protrudes from the distal end of the guiding portion and that is thinner than the fitting portion, and wherein a side surface of the columnar portion on the side of the first direction is parallel to the axial direction or is formed into an inclined surface whose inclination angle with respect to the axial direction is smaller than that of the guiding portion.

* * * * *